(12) United States Patent
Yamada (10) Patent No.: US 8,759,135 B2
(45) Date of Patent: Jun. 24, 2014

(54) METHOD OF MANUFACTURING CAMERA MODULE BY BREAKING INSULATING FILM

(75) Inventor: Manabu Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 491 days.

(21) Appl. No.: 13/077,047

(22) Filed: Mar. 31, 2011

(65) Prior Publication Data

US 2011/0305449 A1    Dec. 15, 2011

(30) Foreign Application Priority Data

Jun. 14, 2010   (JP) .................. 2010-135368

(51) Int. Cl.
*H01L 21/00* (2006.01)
*H01L 31/062* (2012.01)
*H01L 31/113* (2006.01)

(52) U.S. Cl.
USPC ............... 438/48; 438/29; 438/70; 257/291; 396/535

(58) Field of Classification Search
USPC ........ 438/48, 22, 25, 26, 27, 29, 70; 257/291, 257/98, 294, 226, 233, 444; 396/535
See application file for complete search history.

(56) References Cited

U.S. PATENT DOCUMENTS

| 2006/0011932 A1* | 1/2006 | Kim ................................ 257/98 |
| 2008/0020505 A1* | 1/2008 | Akram et al. ................... 438/48 |
| 2011/0019077 A1 | 1/2011 | Kobayashi et al. |

FOREIGN PATENT DOCUMENTS

| JP | 2003-324660 | 11/2003 |
| JP | 2005-348275 | 12/2005 |
| JP | 2010-56170 | 3/2010 |

* cited by examiner

*Primary Examiner* — Matthew Reames
*Assistant Examiner* — Dilinh Nguyen
(74) *Attorney, Agent, or Firm* — Oblon, Spivak, McClelland, Maier & Neustadt, L.L.P.

(57) ABSTRACT

According to one embodiment, a method of manufacturing a camera module includes, disposing a first member on the image sensor, the first member includes a first non-conductor, a first metal film covering the first non-conductor, and a first insulation film covering the first metal film, disposing a second member on or above the first member, the second member includes a second non-conductor, a second metal film covering the second non-conductor, and a second insulation film covering the second metal film, and applying a predetermined voltage between the first member and the second member or between the image sensor and the second member, thereby breaking at least parts of the first insulation film and the second insulation film.

12 Claims, 7 Drawing Sheets

METHOD OF MANUFACTURING CAMERA MODULE BY BREAKING INSULATING FILM

CROSS-REFERENCE TO RELATED APPLICATIONS

This application is based upon and claims the benefit of priority from Japanese Patent Application No. 2010-135368, filed Jun. 14, 2010; the entire contents of which are incorporated herein by reference.

FIELD

Embodiments described herein relate generally to a camera module and a method of manufacturing the same.

BACKGROUND

As a component of a camera module, use is made of, for example, a component which is formed of a non-conductor (plastic). A measure, such as EMC or ESD, needs to be applied to this component. In this measure, metal evaporation deposition is applied to this component, thereby setting the resistance value of the component within a fixed resistance value range. There is a case in which a plurality of such components are used in the camera module. However, in some cases, an oxide film is formed on the surface of each component to which metal evaporation deposition is applied. The components with surfaces, on which oxide films are formed, are connected to each other via the oxide films. In this manner, since the oxide films are present at the connection parts between the respective components, there is a problem that the resistance value at the connection parts between the components increases. It is thus difficult to form a camera module in which the resistance value is decreased.

DETAILED DESCRIPTION

In general, according to one embodiment, a method of manufacturing a camera module includes; disposing a first member on the image sensor, the first member comprising a first non-conductor, a first metal film covering the first non-conductor, and a first insulation film covering the first metal film; disposing a second member on or above the first member, the second member comprising a second non-conductor, a second metal film covering the second non-conductor, and a second insulation film covering the second metal film; and applying a predetermined voltage between the first member and the second member or between the image sensor and the second member, thereby breaking at least parts of the first insulation film and the second insulation film.

Embodiments will now be described in detail with reference to the accompanying drawings.

Embodiment

Figure 1A:
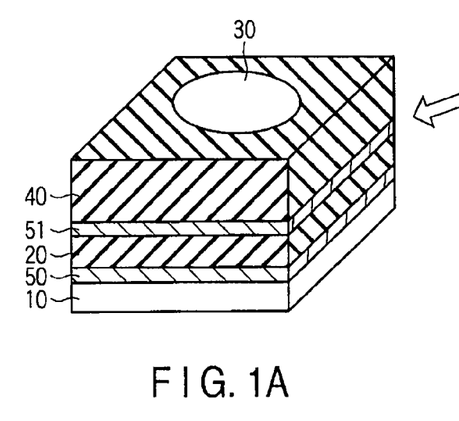
FIG. 1A is a perspective view which schematically shows the basic structure of a camera module according to an embodiment.
Figure 1B:
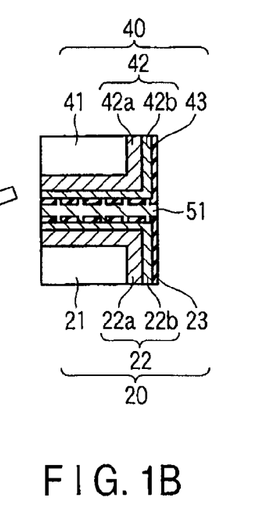
FIG. 1B is a cross-sectional view of a boundary between an image sensor protector and a lens protector in FIG. 1A.

Referring to FIG. 1A and FIG. 1B, the basic structure of a camera module according to an embodiment is schematically described. FIG. 1A is a perspective view which schematically shows the basic structure of the camera module according to the embodiment, and FIG. 1B is a cross-sectional view of a boundary between an image sensor protector and a lens protector in FIG. 1A. This camera module is used, for example, in an electronic information apparatus such as a camera-equipped mobile phone device or a TV phone device, which includes an image pickup module as an image input device.

As shown in FIG. 1A or FIG. 1B, the camera module comprises an image sensor 10, an image sensor protector (first member) 20, a lens 30 and a lens protector (second member) 40.

The image sensor 10 is an imaging device such as a charge coupled device (CCD) or a complementary metal oxide semiconductor (CMOS). The image sensor 10 generates and outputs an electric signal in accordance with light which is made incident on an imaging area (pixel area) (not shown) via the lens 30. In addition, the image sensor 10 includes, on its front surface (first surface) a pixel area (not shown) and a circuit area including an analog circuit and a digital circuit. Furthermore, the image sensor 10 includes, for example, a plurality of solder balls (not shown) on its back surface (second surface parallel to the first surface).

The image sensor protector 20 is connected to the image sensor 10 by an Ag (silver)-based electrically conductive adhesive 50 which is provided on a peripheral part of the front surface of the image sensor 10. The image sensor protector 20 protects the pixel area of the image sensor 10. In the meantime, the light transmittance of the electrically conductive adhesive 50 is less than 10%. An area where the conductive adhesive 50 is not present is provided between the image sensor protector 20 and image sensor 10. This aims at preventing a decrease in light transmittance and performance, which would occur if the electrically conductive adhesive 50 is coated on a micro-lens (not shown) which is provided on the pixel area of the image sensor 10. The image sensor protector 20 is formed of, for example, a non-conductor (plastic), and is covered with a multilayer film comprising a metal film and a metal oxide film (insulation film).

The lens 30 has desired optical characteristics, and is composed of, for example, an IR (infrared) cutting filter and a plurality of lenses. The lens protector 40 holds the lens 30, and is electrically connected to the image sensor protector 20 by an electrically conductive adhesive 51. The lens protector 40 is formed of a non-conductor (plastic) and is covered with a multilayer film comprising a metal film and a metal oxide film.

In the image sensor protector 20, a metal film 22 is formed on the surface of a non-conductor (plastic) portion 21, and a metal oxide film (also referred to simply as "oxide film" or "insulation film") 23 is formed on the surface of the metal film 22. The metal film 22 comprises an under-plate (underlying metal film) 22a which is formed of, e.g. Cu (copper), and a top-plate (overlying metal film) 22b which is formed of, e.g. SUS (stainless steel) on the under-plate 22a. The oxide film 23, which is formed by oxidation of a part (surface) of the metal film 22, is formed on the surface of the metal film 22. The oxide film 23 is formed, for example, discontinuously (brokenly), on that surface thereof, which is connected to the lens protector 40 by the electrically conductive adhesive 51. In the meantime, this oxide film 23 may not be discontinuous, but may be partly (locally) broken.

In the lens protector 40, a metal film 42 is formed on the surface of a non-conductor (plastic) portion 41, and a metal oxide film (also referred to simply as "oxide film" or "insulation film") 43 is formed on the surface of the metal film 42. The metal film 42 comprises, like the metal film 22, an under-plate (underlying metal film) 42a which is formed of, e.g. Cu (copper), and a top-plate (overlying metal film) 42b which is formed of, e.g. SUS (stainless steel) on the under-plate 42a. The oxide film 43, which is formed by oxidation of a part (surface) of the metal film 42, is formed on the surface of the metal film 42. The oxide film 43 is formed, for example, discontinuously (brokenly), on that surface thereof, which is connected to the image sensor protector 20 by the electrically conductive adhesive 51. In the meantime, this oxide film 43 may not be discontinuous, buy may be partly (locally) broken.

Accordingly, the image sensor protector 20 and lens protector 40 are electrically connected by the electrically conductive adhesive 51.

The metal film 22, 42 may not have the multilayer structure of the under-plate and top-plate, but may be formed of aluminum.

Figure 2:
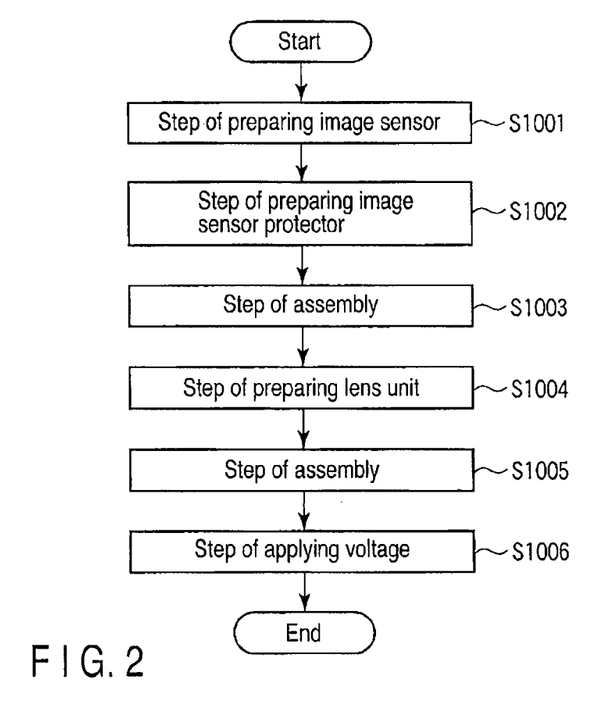
FIG. 2 is a flow chart schematically illustrating a basic manufacturing method of the camera module according to the embodiment.
Figure 3:
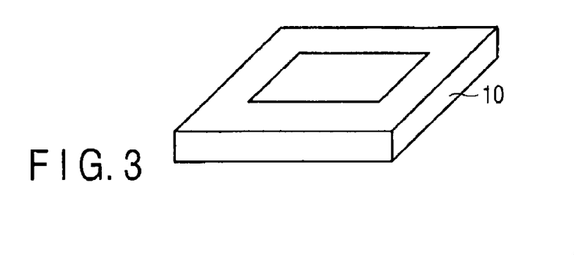
FIG. 3 is a perspective view which schematically illustrates the basic manufacturing method of the camera module according to the embodiment.
Figure 4A:
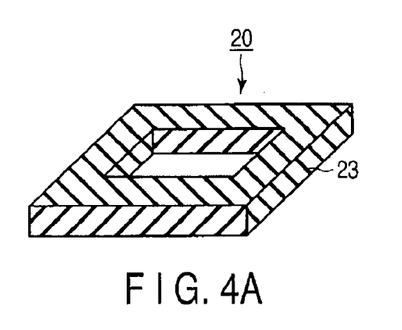
FIG. 4A is a perspective view which schematically illustrates the basic manufacturing method of the camera module according to the embodiment.
Figure 4B:
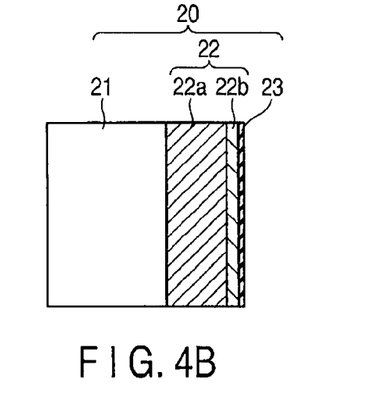
FIG. 4B is a cross-sectional view of a part of a multilayer structure of FIG. 4A.
Figure 5:
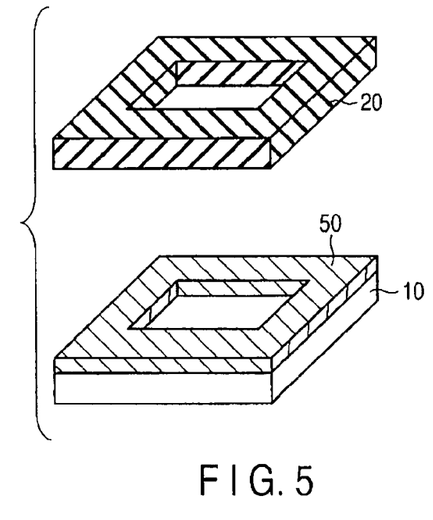
FIG. 5 is a perspective view which schematically illustrates the basic manufacturing method of the camera module according to the embodiment.
Figure 6:
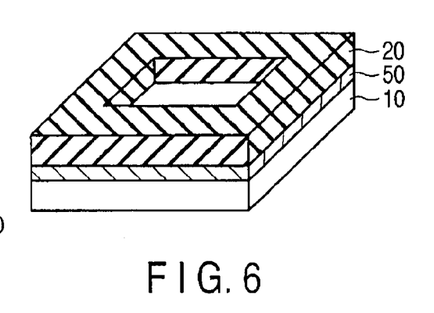
FIG. 6 is a perspective view which schematically illustrates the basic manufacturing method of the camera module according to the embodiment.
Figure 7A:
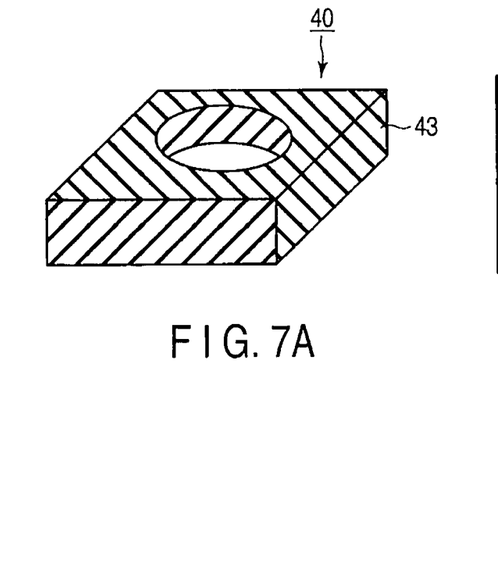
FIG. 7A is a perspective view which schematically illustrates the basic manufacturing method of the camera module according to the embodiment.
Figure 7B:
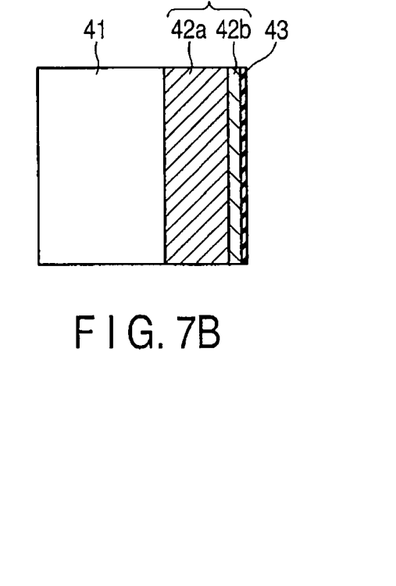
FIG. 7B is a cross-sectional view of a part of a multilayer structure of FIG. 7A.
Figure 8:
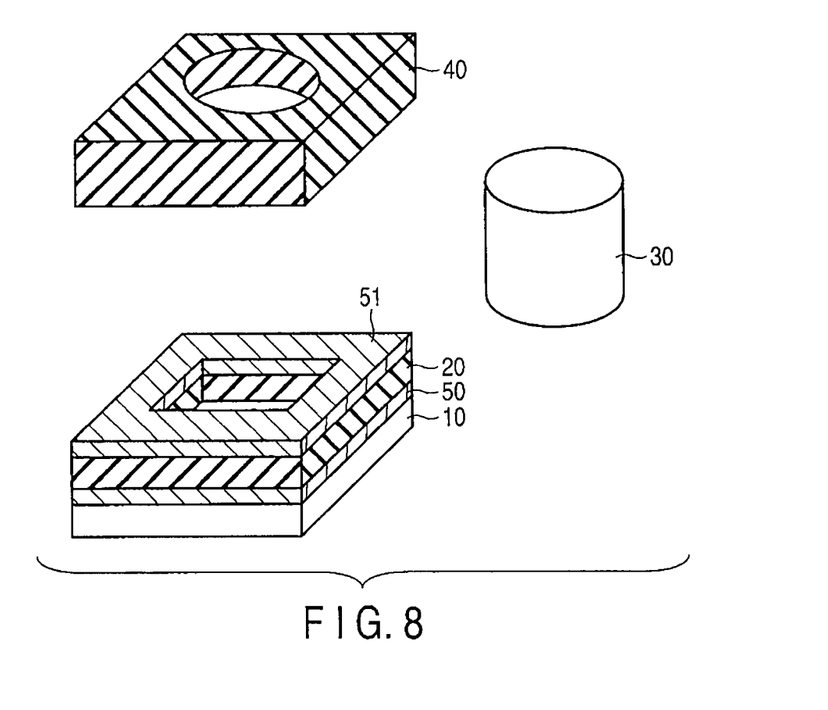
FIG. 8 is a perspective view which schematically illustrates the basic manufacturing method of the camera module according to the embodiment.
Figure 9A:
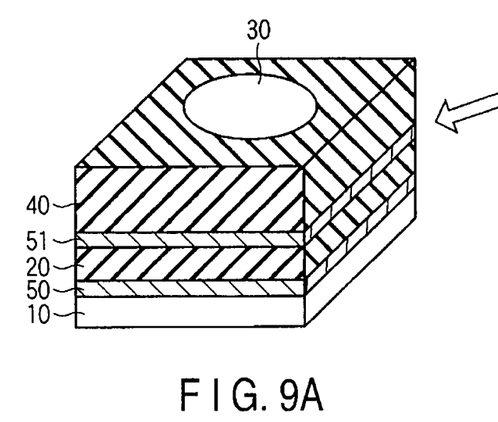
FIG. 9A is a perspective view which schematically shows the basic manufacturing method of the camera module according to the embodiment.
Figure 9B:
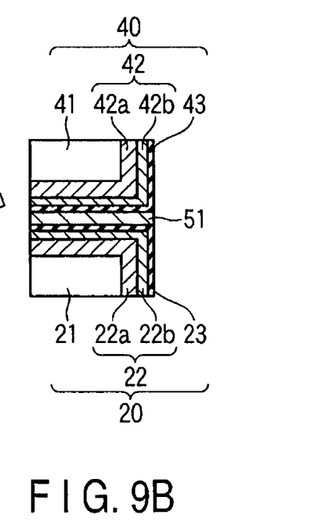
FIG. 9B is a cross-sectional view of a boundary between an image sensor protector and a lens protector in FIG. 9A.

Next, referring to FIGS. 2, 3, 4A, 4B, 5, 6, 7A, 7B, 8, 9A, 9B and 10, a description is given of a method of manufacturing a camera module of the embodiment. FIG. 2 is a flow chart illustrating a basic manufacturing method of the camera module according to the embodiment. FIGS. 3, 5, 6, 8 and 10 are perspective views which schematically illustrate the basic manufacturing method of the camera module according to the embodiment. FIGS. 4A and 7A are perspective views which schematically illustrate the basic manufacturing method of the camera module according to the embodiment, and FIGS. 4B and 7B are cross-sectional views of parts of multilayer structures of FIGS. 4A and 7A. FIG. 9A is a perspective view which schematically shows the basic manufacturing method of the camera module according to the embodiment, and FIG. 9B is a cross-sectional view of a boundary between an image sensor protector and a lens protector in FIG. 9A.

[Step S1001]

To start with, as shown in FIG. 3, an image sensor 10, which has been formed through fabrication steps of an image sensor, is prepared.

[Step S1002]

Subsequently, an image sensor protector 20, which protects the image sensor 10, is prepared. In a method of forming the image sensor protector 20, as shown in FIG. 4A and FIG. 4B, Cu, which becomes an under-plate 22a, is deposited on the surface of a non-conductor (plastic) portion 21 by metal evaporation deposition (metalize evaporation deposition). Then, SUS, which becomes a top-plate 22b is deposited on the surface of the under-plate 22a by metal evaporation deposition. Thus, a metal film 22 is obtained. Thereafter, by the contact of the top-plate 22b with outside air, the surface of the top-plate 22b is oxidized, and an oxide film 23 is formed. Thereby, the image sensor protector 20, which is formed of a multiplayer structure comprising the non-conductor portion 21, metal film 22 and oxide film 23, is formed.

[Step S1003]

Next, as shown in FIG. 5, Ag of an electrically conductive adhesive 50 is coated on an area of the image sensor 10, which is other than a pixel area of the image sensor 10, or that surface of the image sensor protector 20, which is to be attached to the image sensor 10. Then, as shown in FIG. 6, the image sensor 10 and the image sensor protector 20 are attached. At this time, the electrically conductive adhesive 50 is coated in such a manner that the adhesive 50 may not project from between the image sensor 10 and image sensor protector 20.

[Step S1004]

Next, a lens unit comprising a lens 30 and a lens protector 40 is prepared. In a method of forming the lens protector 40, like the above-described method of forming the image sensor protector 20, as shown in FIG. 7A and FIG. 7B, Cu, which becomes an under-plate 42a, is deposited on the surface of a non-conductor (plastic) portion 41 by metal evaporation deposition. Then, SUS, which becomes a top-plate 42b is deposited by evaporation on the surface of the under-plate 42a. Thus, a metal film 42 is obtained. Thereafter, by the contact of the top-plate 42b with outside air, the surface of the top-plate 42b is oxidized, and an oxide film 43 is formed. Thereby, the lens protector 40, which is formed of a multiplayer structure comprising the non-conductor portion 41, metal film 42 and oxide film 43, is formed.

[Step S1005]

Next, as shown in FIG. 8, Ag of an electrically conductive adhesive 51 is coated on that surface of the image sensor protector 20, which is to be attached to the lens protector 40, or that surface of the lens protector 40, which is to be attached to the image sensor protector 20. Then, as shown in FIG. 9A and FIG. 9B, the image sensor protector 20 and the lens protector 40 are attached so as to hold the lens 30.

[Step S1006]

Figure 10:
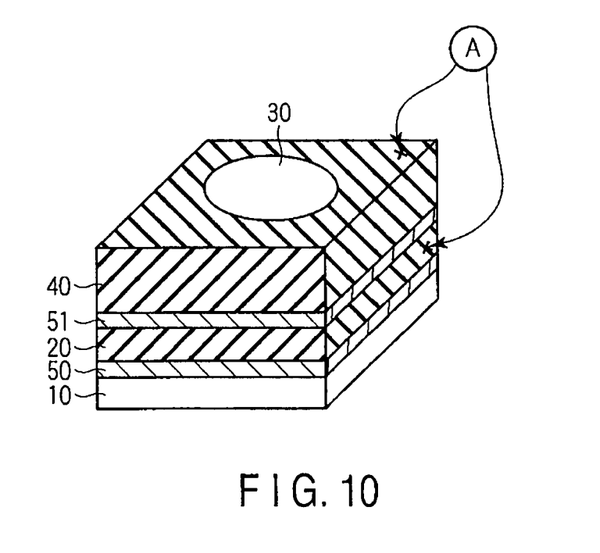
FIG. 10 is a perspective view which schematically illustrates the basic manufacturing method of the camera module according to the embodiment.

Next, as shown in FIG. 10, a low voltage (breaking voltage) of about 5 V, which does not apply a load on the image sensor 10, is applied between the image sensor protector 20 and lens protector 40. When the voltage is applied, the voltage is applied to locations at which no problem arises from the standpoint of the external appearance. By the application of the voltage, the oxide films 23 and 43 between the image sensor protector 20 and lens protector 40 are partly broken. Specifically, those surfaces of the oxide films 23 and 43, which are in contact with the electrically conductive adhesive 51, are partly broken. By the flow of the electrically conductive adhesive 51 to the broken parts, the metal films 22 and 42 come in contact with the conductive adhesive 51, and thereby the metal films 22 and 42 are electrically connected.

Figure 11:
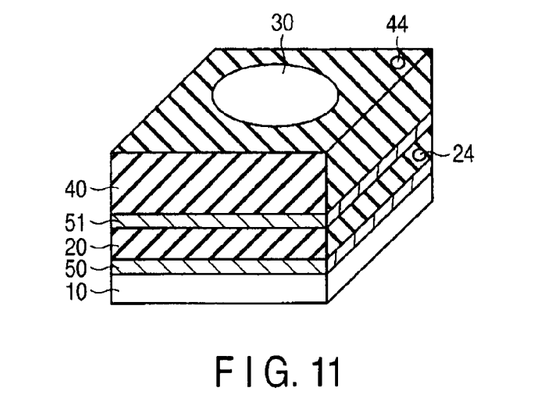
FIG. 11 is a perspective view which schematically shows another example of the basic structure of the camera module according to the embodiment.

In the meantime, as shown in FIG. 11, it is preferable that the image sensor protector 20 be provided in advance with a mark 24 at a location where the breaking voltage is to be applied, and lens protector 40 be provided in advance with a mark 44 at a location where the breaking voltage is to be applied. Preferably, the mark 24 should be, for example, an angle recognition portion of the camera module on the side surface of the image sensor protector 20. In addition, the mark 44 should be provided, for example, on the upper surface of the lens protector 40. More preferably, each of the marks 24 and 44 should have a recess shape or a projection shape.

When the breaking voltage is applied, the breaking voltage may be applied after removing the insulation film at the location where the breaking voltage is to be applied.

According to the above-described embodiment, the method of manufacturing a camera module includes preparing an image sensor 10; preparing a first member 20 comprising a first non-conductor 21, a first metal film 22 covering the first non-conductor 21, and a first insulation film 23 covering the first metal film 22; a second member 40 comprising a second non-conductor 41, a second metal film 42 covering the second non-conductor 41, and a second insulation film 43 covering the second metal film 42; disposing the first member 20 on the image sensor 10; disposing the second member 40 on or above the first member 20; and applying a predetermined voltage between the first member 20 and the second member 40 disposed on the first member 20, thereby breaking at least parts of the first insulation film 23 and the second insulation film 43. In addition, the first member 20 is disposed on the image sensor 10 via a first electrically conductive material 50, and the second member 40 is disposed on the first member 20 via a second electrically conductive material 51.

Thus, the oxide films (insulation films), which are formed between the respective components, can partly be removed (broken). In addition, by partly removing the insulation films, the respective components can electrically be connected via the electrically conductive adhesives. Therefore, the resistance value can be decreased even in the camera module using a plurality of components each comprising a non-conductor (plastic) portion, a metal film formed on the non-conductor portion, and an insulation film formed on the metal film. As a result, a high-quality camera module with a decreased resistance value can be obtained.

In addition, since the camera module angle recognition portion of the image sensor protector 20 is used as the mark 24 at which the breaking voltage is applied, it is possible to suppress the damage to locations other than the angle recognition portion of the metal film 22. Even if the breaking voltage is applied to the angle recognition portion, there is little effect on the performance or quality.

Furthermore, since the mark 44 at which the breaking voltage is applied is provided on the upper surface of the lens protector 40, the mark 44 is covered with a protector (not shown) which protects the camera module after an FAT (Final Assembly Test) step. Thereby, the damage to the metal film 42 (mark 44) can be hidden from the external appearance.

Besides, the range of damage to the metal films 22 and 24 can be restricted to a recess portion or a projection portion by forming the marks 24 and 44 in a recess shape or a projection shape.

In this manner, by providing the marks 24 and 44 to which the breaking voltage is applied, a desired quality of the camera module can be maintained, and the camera module having a desired resistance value can be formed.

(Modification)

Next, referring to FIGS. 12A, 12B, 12C, 13A, 13B, 14A, 14B, 15, 16A, 16B and 16C, a description is given of a camera module according to a modification of the above-described embodiment. In the above-described embodiment, the description has been given of the case of using two components each comprising a non-conductor (plastic) portion, a metal film formed on the non-conductor portion, and an insulation film formed on the metal film. In the present modification, the case of using three such components is described. In the description below, a description of the parts common to those in the above-described embodiment is omitted.

Figure 12A:
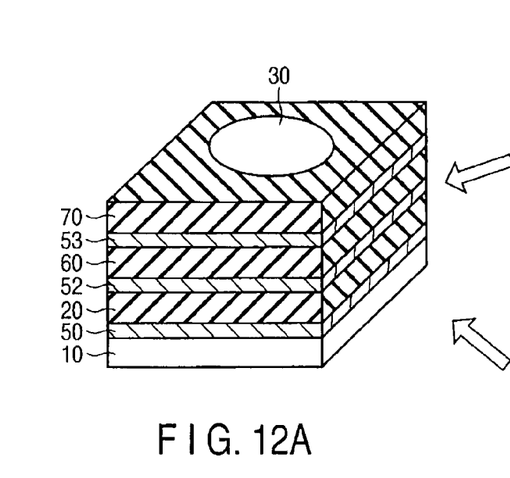
FIG. 12A is a perspective view which schematically shows the basic structure of a camera module according to a modification.
Figure 12B:
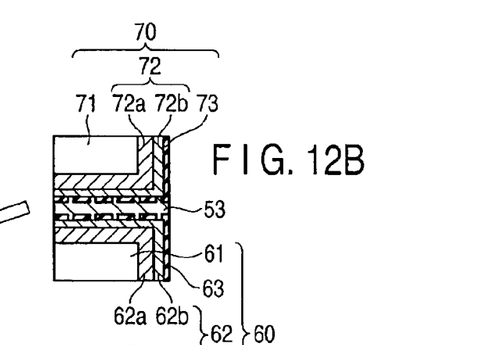
FIG. 12B is a cross-sectional view of a boundary between a first lens protector and a second lens protector in FIG. 12A.
Figure 12C:
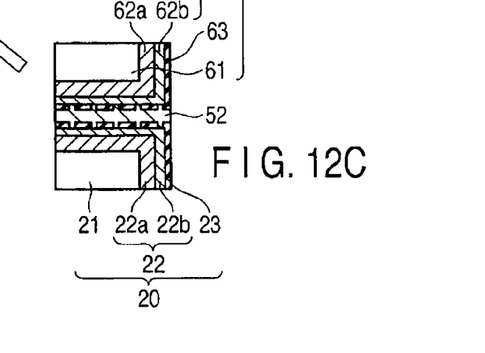
FIG. 12C is a cross-sectional view of a boundary between an image sensor protector and the first lens protector in FIG. 12A.

Referring to FIGS. 12A, 12B and 12C, the basic structure of a camera module according to the present modification is schematically described. FIG. 12A is a perspective view which schematically shows the basic structure of the camera module according to the modification, and FIG. 12B is a cross-sectional view of a boundary between a first lens protector and a second lens protector in FIG. 12A. In addition, FIG. 12C is a cross-sectional view of a boundary between an image sensor protector and the first lens protector in FIG. 12A.

As shown in FIGS. 12A, 12B and 12C, the camera module comprises an image sensor 10, an image sensor protector (first member) 20, a lens 30, a first lens protector (third member) 60 and a second lens protector (second member) 70.

The lens 30 is held by the first lens protector 60 and second lens protector 70. The first lens protector 60 holds, for example, a lower side of the lens 30 and is electrically connected to the image sensor protector 20 by an electrically conductive adhesive 52. The first lens protector 60 is formed of, for example, a non-conductor (plastic) and is covered with a multilayer film comprising a metal film and a metal oxide film. The second lens protector 70 holds, for example, an upper side of the lens 30 and is electrically connected to the first lens protector 60 by an electrically conductive adhesive 53. The second lens protector 70 is formed of, for example, a non-conductor (plastic) and is covered with a multilayer film comprising a metal film and a metal oxide film.

In the first lens protector 60, a metal film 62 is formed on the surface of a non-conductor (plastic) portion 61, and a metal oxide film (also referred to simply as "oxide film" or "insulation film") 63 is formed on the surface of the metal film 62. The metal film 62 comprises an under-plate (underlying metal film) 62a which is formed of, e.g. Cu, and a top-plate (overlying metal film) 62b which is formed of, e.g. SUS on the under-plate 62a. The oxide film 63, which is formed by oxidation of a part (surface) of the metal film 62, is formed on the surface of the metal film 62. The oxide film 63 is formed, for example, discontinuously (brokenly), on that surface thereof which is connected to the image sensor protector 20 by the electrically conductive adhesive 52. In the meantime, this oxide film 63 may not be discontinuous, but may be partly (locally) broken.

Similarly, in the second lens protector 70, a metal film 72 is formed on the surface of a non-conductor (plastic) portion 71, and a metal oxide film (also referred to simply as "oxide film" or "insulation film") 73 is formed on the surface of the metal film 72. The metal film 72, like the metal film 62, comprises an under-plate (underlying metal film) 72a which is formed of, e.g. Cu, and a top-plate (overlying metal film) 72b which is formed of, e.g. SUS on the under-plate 72a. The oxide film 73, which is formed by oxidation of a part (surface) of the metal film 72, is formed on the surface of the metal film 72. The oxide film 73 is formed, for example, discontinuously (brokenly), on that surface thereof which is connected to the first lens protector 60 by the electrically conductive adhesive 53. In the meantime, this oxide film 73 may not be discontinuous, but may be partly (locally) broken.

Accordingly, the image sensor protector 20 and first lens protector 60 are electrically connected by the electrically conductive adhesive 52. In addition, the first lens protector 60 and second lens protector 70 are electrically connected by the electrically conductive adhesive 53. In other words, the image sensor protector 20 and second lens protector 70 are electrically connected by the electrically conductive adhesives 52 and 53 and first lens protector 60.

The metal film 62, 72 may not have the multilayer structure of the under-plate and top-plate, but may be formed of aluminum.

Figure 13A:
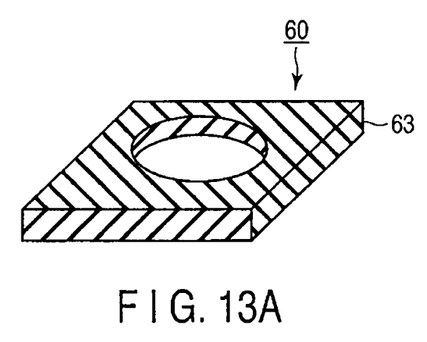
FIG. 13A is a perspective view which schematically illustrates the basic manufacturing method of the camera module according to the modification.
Figure 13B:
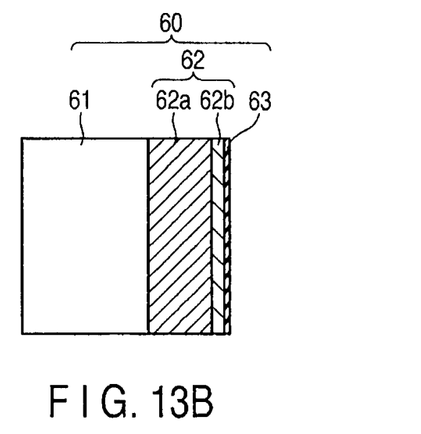
FIG. 13B is a cross-sectional view of a part of a multilayer structure of FIG. 13A.
Figure 14A:
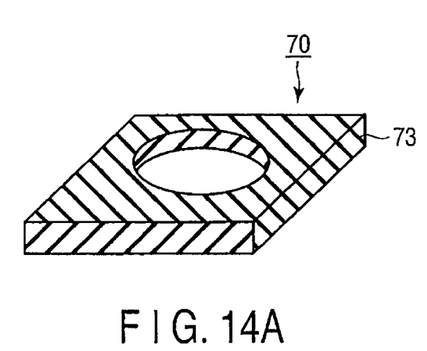
FIG. 14A is a perspective view which schematically illustrates the basic manufacturing method of the camera module according to the modification.
Figure 14B:
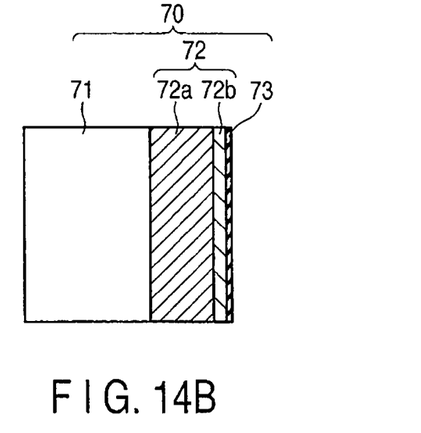
FIG. 14B is a cross-sectional view of a part of a multilayer structure of FIG. 14A.
Figure 15:
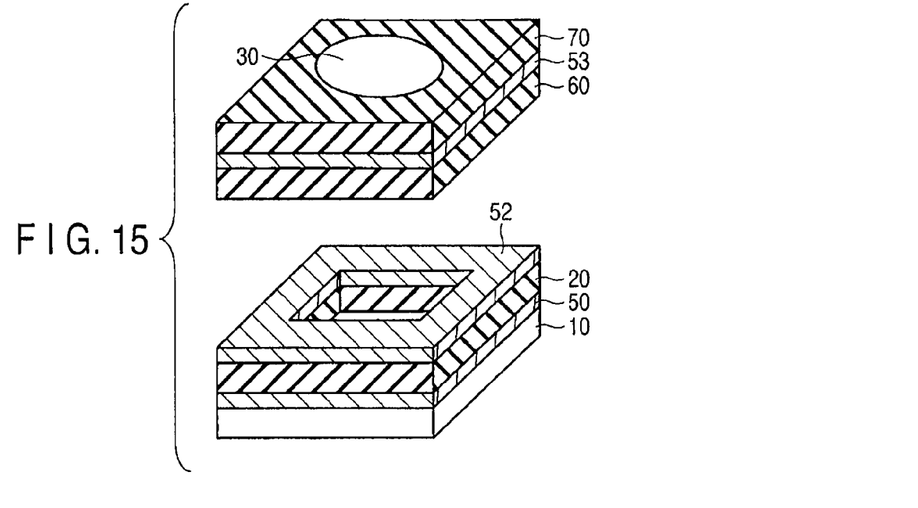
FIG. 15 is a perspective view which schematically illustrates the basic manufacturing method of the camera module according to the modification.
Figure 16A:
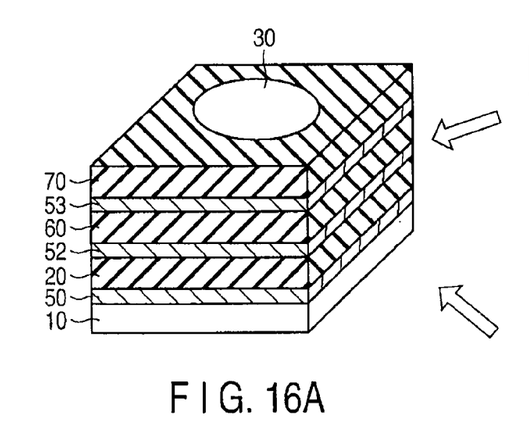
FIG. 16A is a perspective view which schematically shows the basic structure of the camera module according to the modification.
Figure 16B:
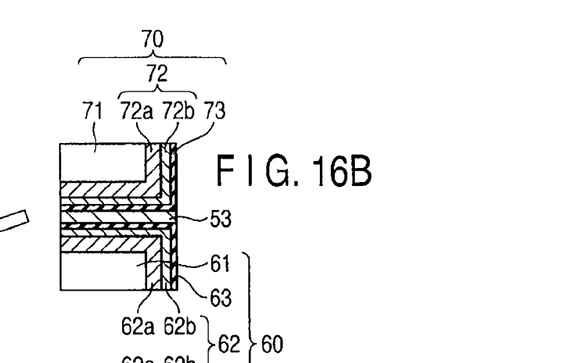
FIG. 16B is a cross-sectional view of a boundary between the first lens protector and the second lens protector in FIG. 16A.
Figure 16C:
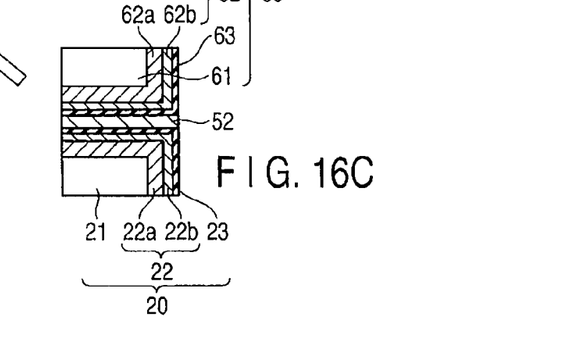
FIG. 16C is a cross-sectional view of a boundary between the image sensor protector and the first lens protector in FIG. 16A.

Next, referring to FIGS. 2, 12A, 12B, 12C, 13A, 13B, 14A, 14B, 15, 16A, 16B and 16C, a description is given of a method of manufacturing the camera module according to the present modification. FIG. 15 is a perspective view which schematically illustrates the basic manufacturing method of the camera module according to the modification. FIGS. 13A and 14A are perspective views which schematically illustrate the basic manufacturing method of the camera module according to the modification, and FIGS. 13B and 14B are cross-sectional views of parts of multilayer structures of FIGS. 13A and 14A. FIG. 16A is a perspective view which schematically shows the basic manufacturing method of the camera module according to the modification, and FIG. 16B is a cross-sectional view of a boundary between a first lens protector and a second lens protector in FIG. 16A. In addition, FIG. 16C is a cross-sectional view of a boundary between an image sensor protector and the first lens protector in FIG. 16A.

[Step S1001]

To start with, an image sensor 10, which has been formed through fabrication steps of an image sensor, is prepared (see FIG. 3).

[Step S1002]

Subsequently, an image sensor protector 20, which protects the image sensor 10, is prepared. In a method of forming the image sensor protector 20, Cu, which becomes an under-plate 22a, is deposited on the surface of a non-conductor (plastic) portion 21 by metal evaporation deposition (metalize evaporation deposition). Then, SUS, which becomes a top-plate 22b is deposited on the surface of the under-plate 22a by metal evaporation deposition. Then, by the contact of the top-plate 22b with outside air, the surface of the top-plate 22b is oxidized, and an oxide film 23 is formed (see FIG. 4A and FIG. 4B).

[Step S10031]

Next, Ag of an electrically conductive adhesive 50 is coated on an area of the image sensor 10, which is other than a pixel area of the image sensor 10, or that surface of the image sensor protector 20, which is to be attached to the image sensor 10. Then, the image sensor 10 and the image sensor protector 20 are attached (see FIG. 5 and FIG. 6).

[Step S1004]

Next, a lens unit comprising a lens 30, a first lens protector 60 and a second lens protector 70 is prepared. In a method of forming the first lens protector 60, like the above-described method of forming the image sensor protector 20, Cu, which becomes an under-plate 62a, is deposited on the surface of a non-conductor (plastic) portion 61 by metal evaporation deposition. Then, SUS, which becomes a top-plate 62b is deposited on the surface of the under-plate 62a. Thus, a metal film 62 is obtained. Then, as shown in FIG. 13A and FIG. 13B, by the contact of the top-plate 62b with outside air, the surface of the top-plate 62b is oxidized, and an oxide film 63 is formed. In a method of forming the second lens protector 70, like the above-described method of forming the image sensor protector 20, Cu, which becomes an under-plate 72a, is deposited on the surface of a non-conductor (plastic) portion 71 by metal evaporation deposition. Then, SUS, which becomes a top-plate 72b is deposited by evaporation on the surface of the under-plate 72a. Thus, a metal film 72 is obtained. Then, as shown in FIG. 14A and FIG. 14B, by the contact of the top-plate 72b with outside air, the surface of the top-plate 72b is oxidized, and an oxide film 73 is formed.

Thereafter, Ag of an electrically conductive adhesive 53 is coated on that surface of the first lens protector 60, which is to be attached to the second lens protector 70, or that surface of the second lens protector 70, which is to be attached to the first lens protector 60. Then, the first lens protector 60 and second lens protector 70 are attached so as to hold the lens 30.

[Step S1005]

Next, as shown in FIG. 15, Ag of an electrically conductive adhesive 52 is coated on that surface of the image sensor protector 20, which is to be attached to the first lens protector 60, or that surface of the first lens protector 60, which is to be attached to the image sensor protector 20. Then, as shown in FIGS. 16A, 16B and 16C, the image sensor protector 20 and the first lens protector 60 are attached.

[Step S1006]

Next, a low voltage (breaking voltage) of about 5 V, which does not apply a load on the image sensor 10, is applied between the image sensor protector 20 and the second lens protector 70. When the voltage is applied, the voltage is applied to locations at which no problem arises from the standpoint of the external appearance. By the application of the voltage, the oxide films 23 and 63 between the image sensor protector 20 and first lens protector 60, and the oxide films 63 and 73 between the first lens protector 60 and second lens protector 70 are partly broken. Specifically, those surfaces of the oxide films 23 and 63, which are in contact with the electrically conductive adhesive 52, are partly broken. Similarly, those surfaces of the oxide films 63 and 73, which are in contact with the electrically conductive adhesive 53, are partly broken. Thereby, the metal films 22 and 62 are put in contact with the electrically conductive adhesive 52. In addition, the metal film 62 and metal film 72 are electrically connected.

In the meantime, it is preferable that the image sensor protector 20 be provided in advance with a mark at a location where the breaking voltage is to be applied, and the second lens protector 70 be provided in advance with a mark at a location where the breaking voltage is to be applied. Preferably, the mark should be provided on, for example, an angle recognition portion of the camera module on the side surface of the image sensor protector 20, or on the upper surface of the second lens protector 70. More preferably, the mark should have a recess shape or a projection shape.

When the breaking voltage is applied, the breaking voltage may be applied after removing the insulation film at the location where the breaking voltage is to be applied.

According to the above-described modification, the method of manufacturing a camera module includes preparing an image sensor 10; preparing a first member 20 comprising a first non-conductor 21, a first metal film 22 covering the first non-conductor 21, and a first insulation film 23 covering the first metal film 22; a second member 70 comprising a second non-conductor 71, a second metal film 72 covering the second non-conductor 71, and a second insulation film 73 covering the second metal film 72; disposing the first member 20 on the image sensor 10; disposing the second member 70 on the first member 20; and applying a predetermined voltage between the first member 20 and the second member 70 disposed on the first member 20, thereby breaking parts of the first insulation film 23 and the second insulation film 73. In addition, a third member 60 comprising a third non-conductor 61, a third metal film 62 covering the third non-conductor 61, and a third insulation film 63 covering the third metal film 62 is disposed between the first member 20 and the second member 70. When the predetermined voltage is applied, a part of the third insulation film 63 is broken. Moreover, the first member 20 is disposed on the image sensor 10 via a first electrically conductive material 50, the third member 60 is disposed on the first member 20 via an electrically conductive material 52, and the second member 70 is disposed on the third member 60 via an electrically conductive material 53.

Thus, like the above-described embodiment, the oxide films (insulation films), which are formed between the respective components, can partly be removed (broken). In addition, by partly removing the insulation films, the respective components can electrically be connected via the electrically conductive adhesives. Therefore, the resistance value can be decreased even in the camera module using a plurality of components each comprising a non-conductor (plastic) portion, a metal film formed on the non-conductor portion, and an insulation film formed on the metal film. As a result, a high-quality camera module with a decreased resistance value can be obtained.

In the above-described embodiment and the modification, the description has been given of the cases in which use is made of two or more components each comprising a non-conductor (plastic) portion, a metal film formed on the non-conductor portion, and an insulation film formed on the metal film. However, the configuration is not limited to these cases.

In the embodiment and modification, the breaking voltage is applied to the image sensor protector and lens protector. However, the breaking voltage may be applied to the image sensor, in place of the image sensor protector. In this case, an insulation film provided between the image sensor and the image sensor protector is partly broken.

The camera module described in each of the embodiment and modification includes the image sensor and the lens or the above-described components. However, the configuration is not limited to this example. For example, in a configuration including a plurality of components each comprising a non-conductor (plastic) portion, a metal film formed on the non-conductor portion, and an insulation film formed on the metal film, the same voltage application method can be used and the same advantageous effects can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a camera module, comprising:
   disposing a first member on an image sensor, the first member comprising a first non-conductor, a first metal film covering the first non-conductor, and a first insulation film covering the first metal film;
   disposing a second member on or above the first member, the second member comprising a second non-conductor, a second metal film covering the second non-conductor, and a second insulation film covering the second metal film; and
   applying a predetermined voltage between the first member and the second member or between the image sensor and the second member, thereby breaking at least parts of the first insulation film and the second insulation film.

2. The method of claim 1, wherein the disposing the second member on or above the first member includes disposing the second member on or above the first member via a first electrically conductive material.

3. The method of claim 2, wherein when the at least parts of the first insulation film and the second insulation film are broken, the first metal film and the second metal film are electrically connected via the first electrically conductive material at locations of breakage of the first insulation film and the second insulation film.

4. The method of claim 1, wherein the disposing the first member on the image sensor includes disposing the first member on the image sensor via a second electrically conductive material.

5. The method of claim 4, wherein when the at least parts of the first insulation film and the second insulation film are broken, the image sensor and the first metal film are electrically connected via the second electrically conductive material at a location of breakage of the first insulation film.

6. The method of claim 1, further comprising disposing a third member between the first member and the second member, the third member comprising a third non-conductor, a third metal film covering the third non-conductor, and a third insulation film covering the third metal film,
   wherein when the predetermined voltage is applied, at least a part of the third insulation film is broken.

7. The method of claim 6, wherein the disposing the third member between the first member and the second member includes disposing the third member on or above the first member via a third electrically conductive material, and disposing the second member on or above the third member via a fourth electrically conductive material.

8. The method of claim 7, wherein when at least parts of the first insulation film, the second insulation film and the third insulation film are broken, the first metal film and the third metal film are electrically connected via the third electrically conductive material at locations of breakage of the first insulation film and the third insulation film, and the third metal film and the second metal film are electrically connected via the fourth electrically conductive material at locations of breakage of the third insulation film and the second insulation film.

9. The method of claim 1, wherein the predetermined voltage is applied to a first application portion of the first member and a second application portion of the second member.

10. The method of claim 9, wherein the first and second application portions are recess portions or projection portions.

11. The method of claim 9, further comprising removing the first insulation film of the first application portion and the second insulation film of the second application portion, before the predetermined voltage is applied.

12. The method of claim 1, wherein the predetermined voltage is applied to a third application portion of the image sensor and a second application portion of the second member.

* * * * *